(12) United States Patent
Yadavalli et al.

(10) Patent No.: US 8,330,715 B2
(45) Date of Patent: Dec. 11, 2012

(54) CURSOR CONTROL

(75) Inventors: Sriram Yadavalli, Watertown, MA (US);
Yongjun Zhang, Belmont, MA (US);
Antti Koivisto, San Francisco, CA (US)

(73) Assignee: Nokia Corporation, Espoo (FI)

( * ) Notice: Subject to any disclaimer, the term of this patent is extended or adjusted under 35 U.S.C. 154(b) by 443 days.

(21) Appl. No.: 12/456,847

(22) Filed: Jun. 22, 2009

(65) Prior Publication Data

US 2010/0127972 A1    May 27, 2010

Related U.S. Application Data

(63) Continuation of application No. 12/225,891, filed as application No. PCT/IB2006/001288 on Mar. 30, 2006, now abandoned.

(51) Int. Cl.
*G06F 3/033* (2006.01)
*G09G 5/08* (2006.01)
(52) U.S. Cl. .................. 345/157; 345/156; 715/856
(58) Field of Classification Search .......... 345/156–168; 715/856
See application file for complete search history.

(56) References Cited

U.S. PATENT DOCUMENTS

| | | | |
|---|---|---|---|
| 4,987,411 A | | 1/1991 | Ishigami |
| 5,367,631 A | | 11/1994 | Levy |
| 5,673,068 A | * | 9/1997 | Jondrow et al. ............ 345/163 |
| 5,692,114 A | * | 11/1997 | Imai ............................ 345/427 |
| 5,786,805 A | | 7/1998 | Barry |
| 5,805,167 A | * | 9/1998 | van Cruyningen .......... 715/808 |
| 6,229,525 B1 | | 5/2001 | Alexander |
| 6,995,746 B2 | | 2/2006 | Aymeric |
| 2005/0114132 A1 | | 5/2005 | Hsu |

FOREIGN PATENT DOCUMENTS

| | | |
|---|---|---|
| EP | 0 628 905 A1 | 12/1994 |
| TW | 235358 B | 7/2005 |

OTHER PUBLICATIONS

Notification of Transmittal of the International Search Report and the Written Opinion of the International Searching Authority (1 page), International Search Report (4 pages) and Written Opinion of the International Searching Authority (5 pages), 10 pages total.
Office Action from Chinese Patent Application No. 200680054080.2, issued Apr. 28, 2010.
Office Action from Taiwanese Patent Application No. 96109088, dated May 14, 2010.

(Continued)

Primary Examiner — Kimnhung Nguyen
(74) Attorney, Agent, or Firm — Alston & Bird LLP

(57) ABSTRACT

A method involving:
(i) detecting one of a plurality of possible directional input commands for controlling the position of a cursor in a display;
(ii) determining whether the detected directional input should be interpreted as an input under a free-roaming mode or under an attraction mode
(iii) if the detected directional input is interpreted as an input under the free-roaming mode then determining an end position at a predetermined magnitude from the current position on a bearing determined by the detected directional input
(iv) if the detected directional input is interpreted as an input under the attraction mode then determining the end position as coincident with a selectable item;
(v) moving the cursor from the current position to the determined end position in a series of steps; and
(vi) setting the end position as the current position.

20 Claims, 4 Drawing Sheets

OTHER PUBLICATIONS

Letter reporting Office Action of May 14, 2010 from Taiwanese Patent Application No. 96109088, dated Jun. 9, 2010.
International Preliminary Report on Patentability for Application No. PCT/IB2006/001288 dated Sep. 30, 2008.
Notice of Allowance for Taiwan Application No. 96109088 dated Jan. 28, 2011.
Notice of Allowance for Korean Application No. 10-2008-7023672 dated Sep. 28, 2011.
Office Action for Korean Application No. 10-2008-7023672 dated Dec. 30, 2009.
Office Action for Korean Application No. 10-2008-7023672 dated Jul. 5, 2010.
Office Action for Chinese Application No. 200680054080.2 dated May 20, 2011.
Office Action for Canadian Application No. 2,646,011 dated Jan. 5, 2012.

* cited by examiner

CURSOR CONTROL

CROSS-REFERENCE TO RELATED APPLICATION

This application is a continuation of U.S. application Ser. No. 12/225,891 filed Sep. 30, 2008 now abandoned as the U.S. National Stage of International Application No. PCT/IB2006/001288 filed in English Mar. 30, 2006 which was published on Oct. 11, 2007 under International Publication No. WO2007/113612.

FIELD OF THE INVENTION

Embodiments of the present invention relate to cursor control. In particular, they relate to improved cursor control for a mobile device.

BACKGROUND TO THE INVENTION

Mobile devices, in contrast to a desktop computer, have smaller screens and more limited input capabilities. Mobile devices usually have a less familiar or more limited input device for directional control of a cursor. For example, a joystick typically enables a user to move a cursor in four discrete directions (N, W, S and E according to compass bearings) or in eight discrete directions (N, NW, W, SW, S, SE, E, NE). These devices are designed to be operated with a thumb of one hand but it is hard to move the thumb smoothly because of its anatomical characteristics, which makes the cursor movement with each actuation of the input device impulsive and of an unpredictable magnitude. This can cause the cursor to over-shoot or under-shoot the desired selectable item in an unpredictable manner. Placing the cursor over a particular selectable item may be a challenging task because of the impulsive jumping movement of cursor. Overshooting may result in the cursor oscillating about the desired selectable item as the user overshoots the selectable from one direction and then from the other direction and undershooting may result in a frustratingly large number of directional input commands being required.

The challenge arising from the impulsive and unpredictable movement of the cursor has been addressed in the Symbian™ Series 60 operating system. In this system, the cursor does not have a 'free-roaming' mode in which in can be moved over the display at the complete control of the user, instead the cursor in response to directional user input commands jumps only from one selectable item directly to another selectable item. Although this mechanism may be suitable for selecting icons in a menu having a 'designed' layout it is less suitable for navigating to an arbitrary selectable item in the display, such as a character within a text block or a hyperlink in a HTML page.

It would be desirable to provide an intuitive way to of helping a user easily place a cursor over a particular selectable item. This would improve the usability of mobile applications.

BRIEF DESCRIPTION OF THE INVENTION

According to one embodiment of the invention there is provided a method comprising:
(i) detecting one of a plurality of possible directional input commands for controlling the position of a cursor in a display;
(ii) determining a virtual jump in the position of the cursor from a current position to an end position
wherein the end position is:
a) a first end position at a predetermined magnitude from the current position on a bearing determined by the detected directional input
or
b) a second end position coinciding with a selectable item;
(iii) moving the cursor from the current position to the end position in a series of steps; and
(iv) setting the end position as the current position.

According to another embodiment of the invention there is provided a device comprising:
a display for displaying a cursor and one or more items that are selectable using the cursor;
user input device for providing a plurality of possible directional input commands that control a position of the cursor in the display;
a processor operable:
to determine a virtual jump in the position of the cursor from a current position to a end position;
to determine whether an end position is:
a) a first end position at a predetermined magnitude from the current position on a bearing determined by the selected one of the directional inputs
or
b) a second end position coinciding with a selectable item; and
to control movement of the cursor from the current position to the end position in a series of steps, According to a further embodiment of the invention there is provided a method comprising:
(i) detecting one of a plurality of possible directional input commands for controlling the position of a cursor in a display;
(ii) determining whether the detected directional input should be interpreted as an input under a free-roaming mode or under an attraction mode
(iii) if the detected directional input is interpreted as an input under the free-roaming mode then determining an end position at a predetermined magnitude from the current position on a bearing determined by the detected directional input
(iv) if the detected directional input is interpreted as an input under the attraction mode then determining the end position as coincident with a selectable item;
(v) moving the cursor from the current position to the determined end position in a series of steps; and
(vi) setting the end position as the current position.

According to another embodiment of the invention there is provided a computer program operable to:
determine whether a detected directional input should be interpreted as an input under a free-roaming mode or under an attraction mode,
if the detected directional input is interpreted as an input under the free-roaming mode then determine an end position at a predetermined magnitude from the current position on a bearing determined by the detected directional input,
if the detected directional input is interpreted as an input under the attraction mode then determine the end position as coincident with a selectable item, and
enable movement of the cursor from the current position to the determined end position.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 4:
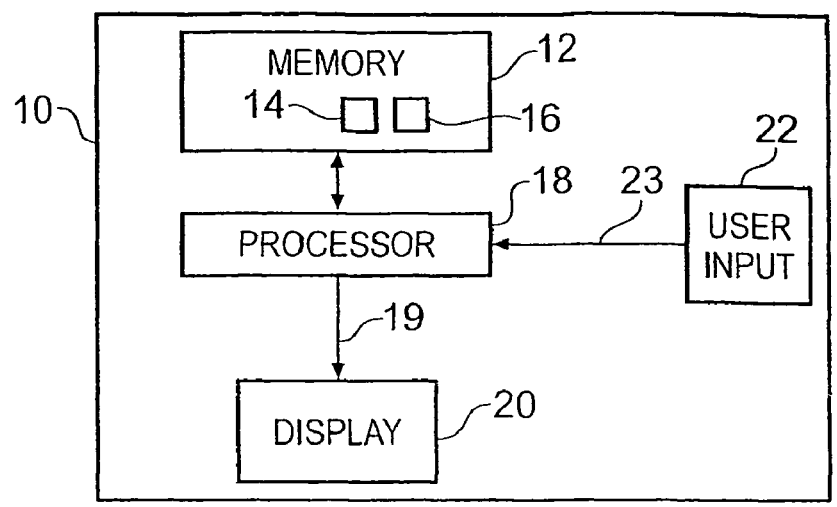
FIG. 4 schematically illustrates an electronic device for receiving directional input commands that move a cursor.

FIG. 4 schematically illustrates an electronic device 10 comprising: a display 20, a computer readable medium, i.e., a storage device in the form of a memory 12 suitable for the device 10, a processor 18 and a user input device 22. Only as many components are described as are necessary to describe the operation of the device in the following paragraphs. It should be appreciated that the device 10 may have additional components and/or alternative components. The electronic device 10 may be a mobile device and may be sized to be hand-portable.

The processor 18 is arranged to read from and write to the memory 12. The processor provides display control signals 19 to the display 20 and receives directional input commands 23 from the user input 22.

Figure 5:
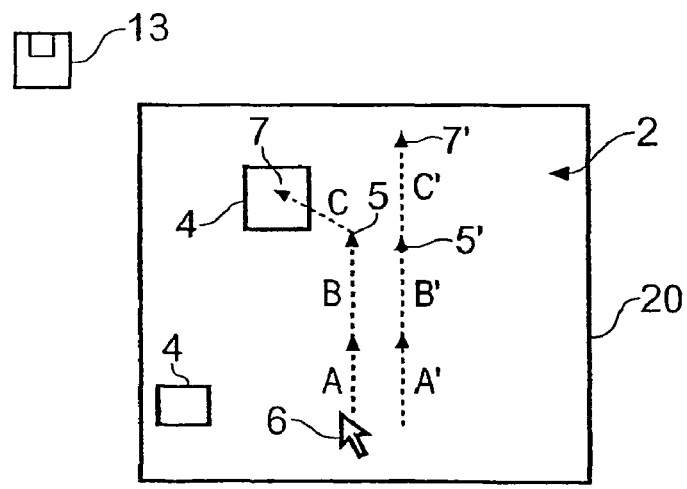
FIG. 5 illustrates the movement of a cursor within a graphical user interface.

The display 20 presents a graphical user interface (GUI) 2 such as that schematically illustrated in FIG. 5. The display 20 displays cursor 6 and one or more items 4 that are selectable using the cursor 6. The items may be buttons, icons, characters in text or similar.

The user input device 22 is a directional controller that enables a plurality of possible directional input commands to be made by a user. The directional input commands 23 control a position and movement of the cursor 6 in the display 20. The user input device 22 may be an arrangement of keys, a roller ball, a joystick or similar. A joystick typically enables a user to move a cursor in four discrete directions (N, W, S and E according to compass bearings) or in eight discrete directions (N, NW, W, SW, S, SE, E, NE).

The memory 12 stores a computer program 14 and a data structure 16 that records the history of directional input commands.

The computer program 14 includes instructions that control the operation of the electronic device 10 when loaded into the processor 18. The computer program instructions provide the logic and routines that enable the electronic device 10 to perform the methods illustrated in FIGS. 1, 2 and 3 and to operate as a cursor controller.

The computer program 14 may arrive at the electronic device 10 via an electromagnetic carrier signal or be copied from a physical entity 13 such as a computer program product, a memory device or a record medium such as a CD-ROM or DVD.

The processor 18 under the control of the computer program 16 is operable as a cursor controller. The cursor controller 18 determines intelligently whether an input directional command 23 should be interpreted as a command under a 'free-roaming mode' or under an 'attraction mode.'

In a 'free-roaming' mode, a cursor 6 moves in a direction or bearing within the GUI 2 that is at the complete control of the directional input commands 23. This enables a user to move the cursor 6 towards an arbitrary position in the GUI 2 which may or may not correspond with a selectable item 4. A directional input command 23 under a free-roaming mode therefore completely specifies the direction of movement of the cursor 6 in response to that command. A directional input command 23 in this mode will typically result in the cursor moving a predetermined fixed offset 11 from the current position on a bearing that is determined by the particular directional input command. The predetermined magnitude of the offset 11 is fixed at a value for each bearing, which may be the same for all bearings.

In an 'attraction mode', a cursor 6 moves to overlie a target selectable item 4. The target selectable item may be determined from possible selectable items by using, in part, an input directional command 23. However, the input directional command 23 does not completely specify the direction of movement of the cursor 6 in response to that command, instead the cursor 6 is 'attracted' to the target selectable item 4. This helps a user easily place a cursor 6 over a selectable item 4 and improves the usability of the electronic device 10. A directional input command 23 in this mode will typically result in the cursor 6 moving directly to overlie a selectable item 4. The magnitude by which the cursor 6 moves may be variable and the bearing on which the cursor moves may be influenced by but is not determined by the particular directional input command 23 that causes the movement.

Referring to FIG. 5, the movement of a cursor 6 in response to three repeated 'N' input directional commands is illustrated as dotted lines. The cursor 6 moves in three jump sequences A, B, C to the selectable item 4. The jump sequences A and B occur under the 'free-roaming' mode. The magnitude of the jumps A and B is the same and the bearing of the jumps is specified by the input directional command 23. The jump sequence C occurs under the 'attraction mode'. The magnitude of the jump C is unrelated to the magnitude of A and B and the bearing of the jump is not determined by the respective input directional command 23 for that jump.

The movement of a cursor 6 in response to three repeated input directional commands 23 from a different starting point is also illustrated as dotted lines. The cursor moves in three jump sequences A', B', C' to an arbitrary location in the GUI 2. The jump sequences A', B' and C' all occur under the 'free-roaming' mode. The magnitude of the jumps A', B' and C' are the same as A and B and the bearing of the jumps is specified by the input directional commands 23. The jump sequence C' occurs under the 'free roaming' mode as opposed to the 'attraction mode' because, for example, the trajectory A', B' is different to A, B and in particular because the end point of the jumps B and B' are at different locations. However, whether a particular jump occurs under the 'free roaming' mode of the 'attraction' mode is not necessarily deterministic and there may be a random element introduced into the decision process.

The movement of the cursor 6 from its current position to an end position in response to an input directional command 23 is smooth and continuous in either of the modes. The trajectory from the current position 5, 5' of the cursor 6, at the time the directional input command 23 is detected, to the determined end point 7, 7' is determined and the cursor 6 is then moved along the trajectory C, C' in a series of discrete steps over a predetermined time interval. The discrete steps are typically a plurality of pixels in size. The transition between the discrete steps is instantaneous so that the cursor 6 appears to move in a continuous manner similar to the movement produced by a desktop computer mouse. Furthermore, speed at which the cursor moves over a trajectory is typically constant.

The processor 18, as cursor controller, detects the directional commands 23 received from the user input device 22 and stores them in the data structure 16. It determines on the receipt of a direction input command 23, from the user input device 22 whether the detected directional input command 23 should be interpreted as commanding a jump in the cursor position under a free-roaming mode or under an attraction mode. The cursor controller determines which mode to use based upon a decision algorithm such as that illustrated in FIG. 1 that attempts to determine whether a user intended to navigate to a particular selectable item or did not intend to navigate to a particular selectable item.

If the detected directional input command 23 is interpreted as an input under the free-roaming mode then the cursor controller 18 determines an end position 7' at a predetermined magnitude from the current position 5' on a bearing determined by the detected directional input command 23.

If the detected directional input command 23 is interpreted as an input under the attraction mode, then the cursor controller 18 determines an end position 7 as coincident with a selectable item 4.

A user is therefore able to easily navigate to a selectable item that has a 'designed' predetermined position (e.g. an icon in a menu) or easily navigate to a selectable item that has an arbitrary position such as a character within a text block or a hyperlink in a HTML page. The cursor 6 moves smoothly across the GUI 2 and intelligently points to selectable items.

Figure 1:
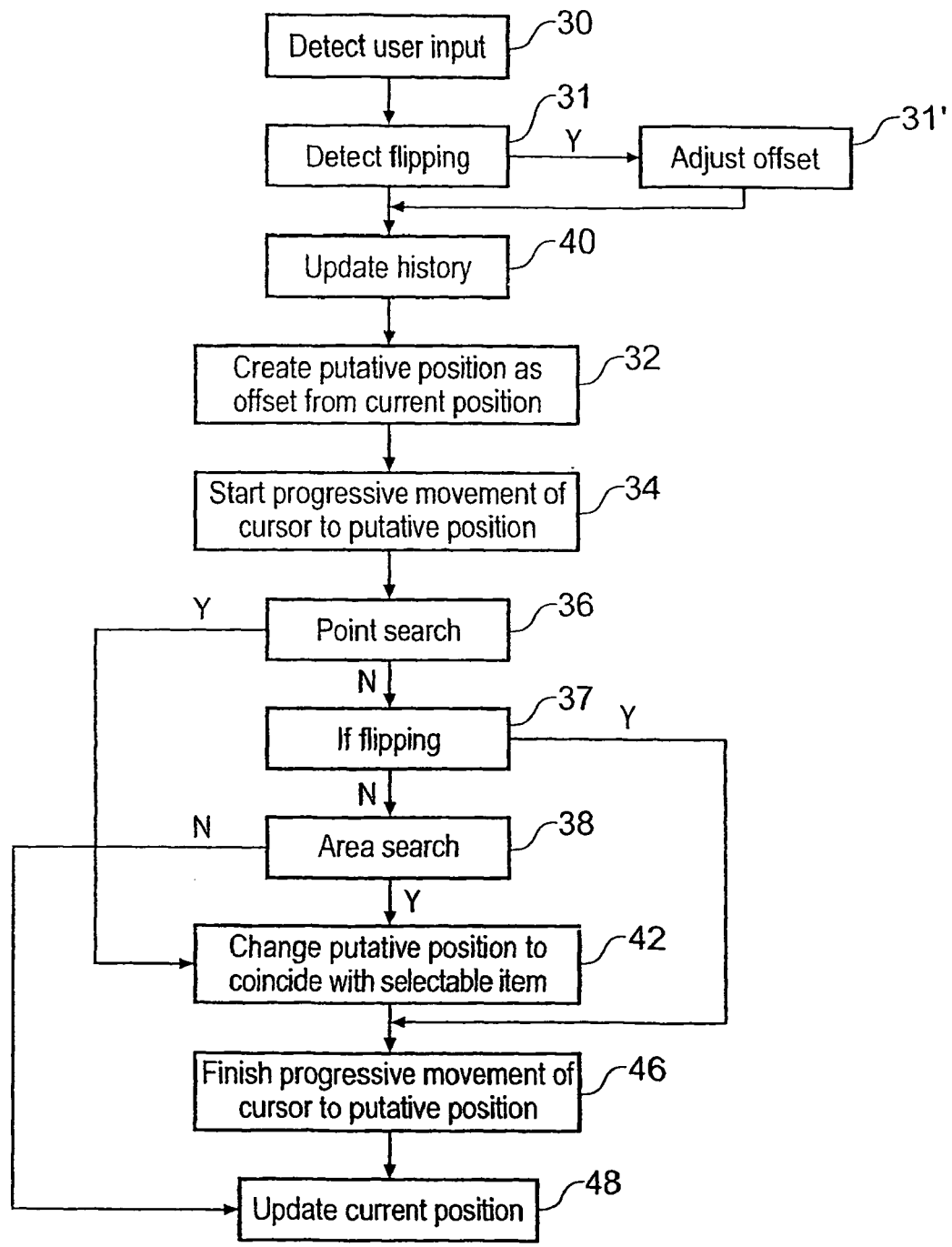
FIG. 1 illustrates a method or algorithm for determining how a cursor is moved in response to a directional input command.

By way of example, FIG. 1 illustrates a method or algorithm for determining how a cursor 6 is moved in response to a directional input command 23.

At step 30, one of a plurality of possible directional input commands 23 for controlling the position of a cursor 6 in a display 20 is detected.

If oscillating movement of the cursor is detected at step 31, the predetermined off-set 11 is reduced at step 31' and the data structure 16 that records the history and timings of the directional input commands 23 used is updated at step 40. A 'flipping' or oscillating flag F is set which is used at step 37. This combination of steps allows a user to more easily place the cursor 6 on small selectable items.

If oscillating movement of the cursor is not detected at step 31, the data structure 16 that records the history and timings of the directional input commands 23 used is updated at step 40.

Oscillating movement of the cursor results from repeated reversal of user input commands in a short space of time and is indicative that the user is continually over-shooting a desired location. The data structure 16 that records the history and timings of the directional input commands 23 is used to detect an oscillating movement of the cursor 6 in response to consecutive countermanding user input commands. Oscillation may be detected if, for example, there are two reversals of direction within a predetermined period such as 1 or 2 seconds.

Figure 6:
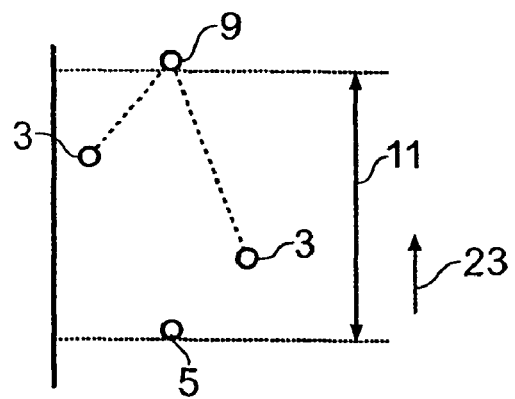
FIG. 6 illustrates an offset or jump made in response to a directional input command, a current cursor position, a putative cursor end point as a result of the directional input command and virtual intermediate positions.

Then at step 32, it is assumed as a default condition that the detected directional input command 23 should be interpreted as commanding a jump in the cursor position under a free-roaming mode. A putative end position 9 is generated as a predetermined offset 11 from the current cursor position 5, 5' as illustrated in FIG. 6. The bearing of the offset 11 relative to the current position is specified by the detected directional input command. The magnitude of the offset 11 may be a constant for all bearings or may be a constant for each bearing. It may also have been adjusted in step 31'.

Next at step 34, the movement of the cursor 6 across the GUI 2 towards the putative end point position 9 starts. This step is optional at this stage and may instead occur immediately before step 46.

Next at steps 36, 38 the cursor controller 18 determines whether it should interpret the detected directional input command 23 as commanding a jump in the cursor position under an attraction mode instead of the default free-roaming mode.

At step 36, a point search is used to discover local selectable item(s) 4 to which the user may be attempting to navigate and then to select as a target selectable item the best candidate from the discovered candidates.

Figure 2:
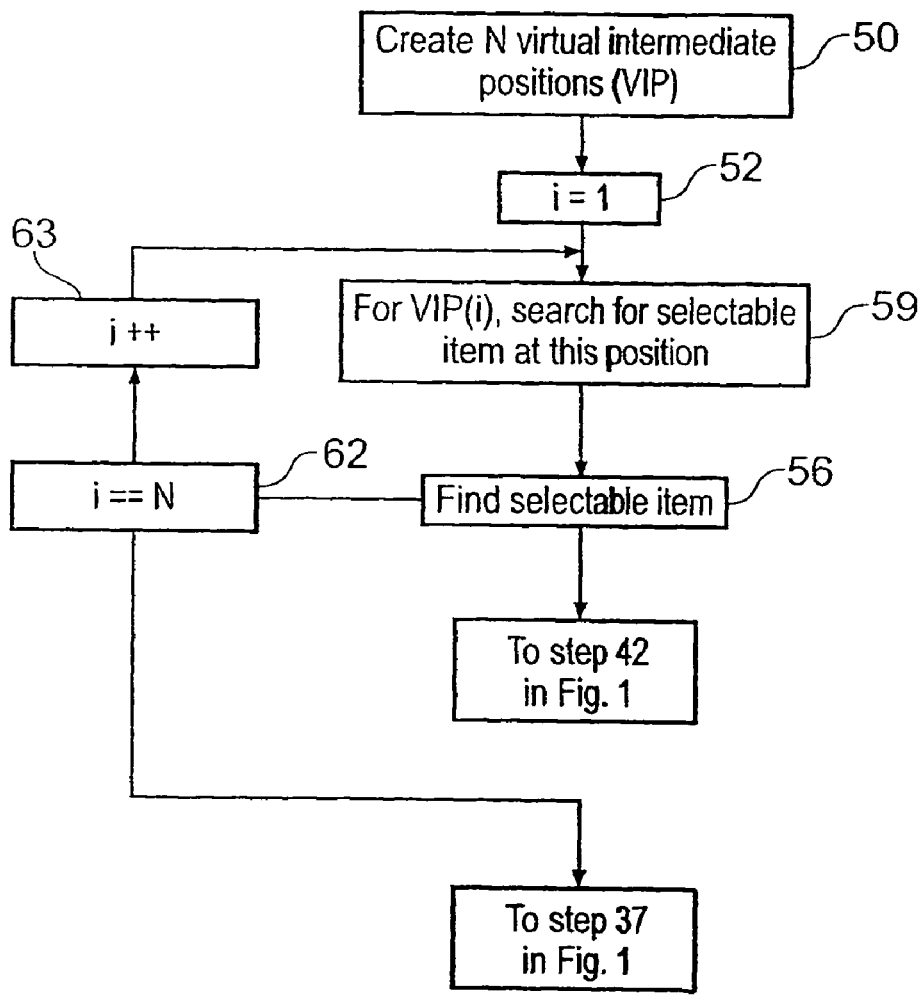
FIG. 2 illustrates a point search process.

The point search process that occurs at step 36 is illustrated in more detail in FIG. 2. N virtual intermediate positions 3 are created at step 50 as illustrated in FIG. 6. N is typically a fairly low value to reduce computation burden such as two or three.

The intermediate positions 3 may be generated with a random component. For example, a virtual intermediate position 3 may be created by determining a trajectory of the cursor 6 to reach the putative end position 9, randomly selecting a point along the trajectory and applying a random off-set to the selected point to generate the virtual intermediate position 3. Certain bounds may be placed on the maximum size of the random off-set. Thus the virtual intermediate positions 3 'trail' the putative end position 9 as illustrated in FIG. 6.

A main loop that cycles through each virtual intermediate position (VIP) is started at step 52, re-entered at step 63 and exited at step 62.

At step 59, a search is performed to determine whether the current virtual intermediate position and the position of a selectable search item are co-located.

At step 56, if the search is successful then the putative position of the cursor is changed at step 42 (FIGS. 1 and 2) to coincide with the selectable item. If the search for that virtual intermediate position is unsuccessful the method moves to step 62. If multiple selectable items are discovered then a 'best' candidate may be selected. The best selectable item may be, for example, the selectable item that is located closest to the current position or to the currently selected item. Other algorithms may be used to determine the closest selectable item.

When the loop is exited via step 62 because no selectable item has been found at the virtual intermediate positions, the method moves to step 37 (FIG. 1).

At step 37, if the flipping flag F has not been set, the method moves to step 38. If the flipping flag F is set, it is un-set and the method moves to step 46.

Figure 3:
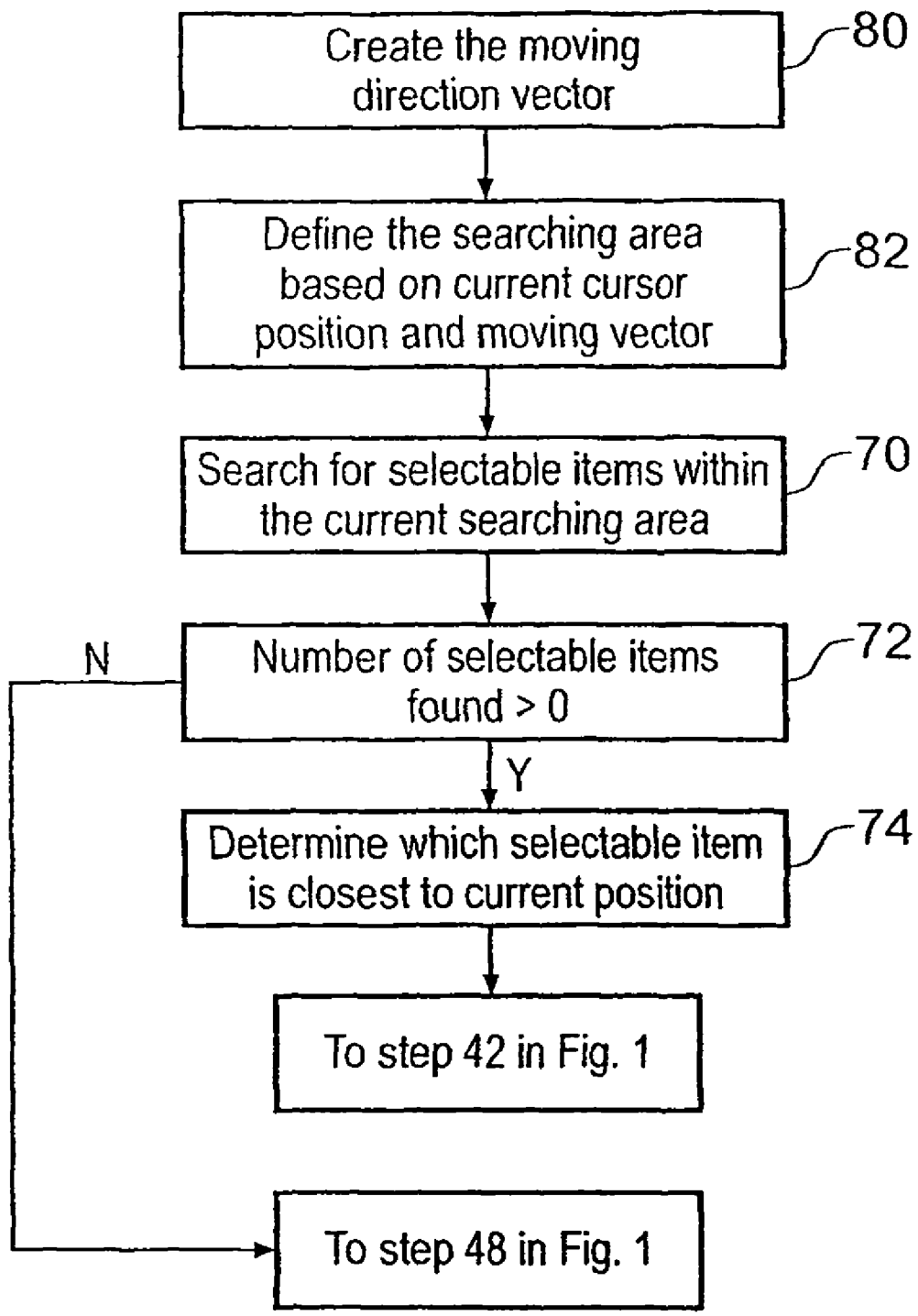
FIG. 3 illustrates an area search process.

At step 38, an area search is performed as illustrated in more detail in FIG. 3.

At step 80, a moving direction vector v is created by plotting a line from the current position 5 to the putative end position 9.

Then at step 82, a search area is generated symmetrically along the vector v. The search area extends from the current position along the vector, and beyond the putative end position 9. The extent of the search may have a predefined maximum.

Then at step 70 a search is performed for selectable items within the generated search area. The search may start at a predefined position within the search area such as the current position or the putative end position and spread from there until a selectable item is found or the search area is exhausted. If, at step 72, the number of selectable items found after completing the search is zero, the method branches to step 48 (FIG. 1). The whole of the search area may be searched and the candidate selectable items found (if any) may be processed at step 74 to find the best candidate selectable item.

The best selectable item may be, for example, the selectable item that is located closest to the current position or to the currently selected item. Other algorithms may be used to determine the closest selectable item. The method then proceeds to step 42 (FIG. 1)

Returning to FIG. 1, if the steps 36 or 38 identify a target selectable item, the putative end position is changed at step 42 so that it coincides with the position of the target selectable item.

After step 42, the process moves to step 46 where the continuous movement of the cursor 6 to the present putative end position continues until it reaches the putative end position.

Then at step 48, the putative end position is set as the current position and the process ends until a new directional input command is received.

The content of the GUI 2 may then be scrolled automatically so that the new current position is positioned centrally in the display. An imaginary rectangle, smaller than the display, may be defined and the scrolling may be performed to keep the cursor 6 within the rectangle.

Although embodiments of the present invention have been described in the preceding paragraphs with reference to various examples, it should be appreciated that modifications to the examples given can be made without departing from the scope of the invention as claimed. For example, in the embodiment described the method or algorithm that determines how a cursor 6 is moved in response to a directional input command 23, involves both a point search and an area search. An area search is used to discover local selectable items of known location, whereas a point search may be used to discover local selectable items of known or unknown location. The area search is a more effective search. In the described embodiment, both an area search and a point search are used as in this example some of the selectable items are of known position while other selectable items are of unknown position. It is of course possible to implement the method with only a point search or only an area search depending upon circumstances.

An additional feature that may be used in embodiments of the invention, is the detection of a special free-roaming user input. If the user input detected at step 30 is a directional input that has been constant for a predetermined time or is the last in a predetermined number of actuations within a defined time interval, then the method illustrated in FIG. 1 may jump to step 48, with the cursor moving a distance in the free-roaming mode that is dependent upon the user input. The distance moved may grow with further input resulting in an accelerating cursor movement. When the user input is released, paused or a different user input is detected the state is reset and the process of FIG. 1 is followed at the next user input.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method comprising:
   (i) detecting one of a plurality of possible directional input commands for controlling the position of a cursor in a display;
   (ii) determining, by a processor, a virtual jump in the position of the cursor from a current position to an end position;
   wherein the end position is:
   a) a first end position at a predetermined magnitude from the current position on a bearing determined by the detected directional input, wherein the end position is, by default, the first end position; or
   b) a second end position coinciding with a selectable item;
   (iii) moving the cursor from the current position to the end position in one or more steps; and
   (iv) setting the end position as the current position.

2. A method as claimed in claim 1, further comprising repeatedly performing operations (i), (ii)(a), (ii) and (iv) and then performing operations (i), (ii)(b) and (iii) to navigate the cursor to a selectable item.

3. A method as claimed in claim 1, wherein when a selectable item lies within an area extending on either side of a trajectory passing through the current position and the first end position, the end position is the second end position.

4. A method as claimed in claim 1, wherein the end position is the second end position when as a consequence of the detected input command it is determined that the selectable item is a candidate destination for the cursor.

5. A method as claimed in claim 1, wherein the second end position is an unpredetermined magnitude from the current position on a bearing influenced by the detected directional input command.

6. A method as claimed in claim 1, wherein the second end position is determined by searching a display area for one or more selectable items.

7. A method as claimed in claim 6, wherein the search area comprises a plurality of sub-areas between the current position and the first end position.

8. A method as claimed in claim 7, wherein the sub-areas are positioned randomly.

9. A method as claimed in claim 6, wherein the search area extends from the current position to beyond the first end position.

10. A method as claimed in claim 1, wherein the predetermined magnitude is variable.

11. A method as claimed in claim 10, wherein the predetermined magnitude is varied in response to detection of an oscillating movement of the cursor in response to consecutive user input commands.

12. A method as claimed in claim 1, wherein, after movement of the cursor, the content of the display is scrolled automatically.

13. A method as claimed in claim 1, wherein the end position in response to a directional input command that is repeated or continuous is a first end position at a predetermined magnitude from the current position.

14. A method as claimed in claim 13, wherein the predetermined magnitude grows as the directional input command is repeated or continued.

15. A computer program product comprising at least one non-transitory computer-readable storage medium tangibly embodying program instructions for causing a computer to perform the method of claim 1.

16. A computer program product comprising at least one non-transitory computer-readable storage medium tangibly embodying computer program instructions, which when loaded into a processor, are configured to cause an apparatus to at least perform:
   determining whether a detected directional input should be interpreted as an input under a free-roaming mode or under an attraction mode;
   if the detected directional input is interpreted as an input under the free-roaming mode then determining an end position at a predetermined magnitude from the current position on a bearing determined by the detected directional input;

if the detected directional input is interpreted as an input under the attraction mode then determining the end position as coincident with a selectable item; and enabling movement of the cursor from the current position to the determined end position.

17. An apparatus comprising a processor and a memory storing computer program code, wherein the memory and stored computer program code are configured, with the processor, to cause the apparatus to at least:

cause display of a cursor and one or more items that are selectable using the cursor on a display;

detect one of a plurality of possible directional input commands that control a position of the cursor in the display;

determine a virtual jump in the position of the cursor from a current position to an end position;

determine whether the end position is:
a) a first end position at a predetermined magnitude from the current position on a bearing determined by the selected one of the directional inputs, wherein the end position is, by default, the first end position; or
b) a second end position coinciding with a selectable item; and control movement of the cursor from the current position to the end position.

18. An apparatus as claimed in claim 17, sized to be held in a human hand.

19. A method comprising:
(i) detecting one of a plurality of possible directional input commands for controlling the position of a cursor in a display;
(ii) determining, by a processor, whether the detected directional input should be interpreted as an input under a free-roaming mode or under an attraction mode;
(iii) if the detected directional input is interpreted as an input under the free-roaming mode then determining an end position at a predetermined magnitude from the current position on a bearing determined by the detected directional input;
(iv) if the detected directional input is interpreted as an input under the attraction mode then determining the end position as coincident with a selectable item;
(v) moving the cursor from the current position to the determined end position in a series of steps; and
(vi) setting the end position as the current position.

20. An apparatus as claimed in claim 17, wherein the apparatus comprises a mobile computing device.

\* \* \* \* \*